United States Patent
Tsuchie et al.

(10) Patent No.: US 7,839,514 B2
(45) Date of Patent: Nov. 23, 2010

(54) DELAYING A WARM-UP START TIME FOR A PRINTING APPARATUS

(75) Inventors: Yasuhiro Tsuchie, Fukuoka (JP); Yoshio Nakamura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 893 days.

(21) Appl. No.: 11/735,015

(22) Filed: Apr. 13, 2007

(65) Prior Publication Data

US 2007/0242301 A1    Oct. 18, 2007

(30) Foreign Application Priority Data

Apr. 17, 2006 (JP) .............................. 2006-113307

(51) Int. Cl.
*G06K 15/00* (2006.01)
*G06F 3/12* (2006.01)
(52) U.S. Cl. .................................... 358/1.14; 358/1.15
(58) Field of Classification Search ................ 358/1.14, 358/1.15
See application file for complete search history.

(56) References Cited

U.S. PATENT DOCUMENTS

| | | |
|---|---|---|
| 2003/0002056 A1 | 1/2003 | Yamaguchi et al. |
| 2003/0218769 A1 | 11/2003 | Otsuka |
| 2003/0227642 A1* | 12/2003 | Anderson et al. .......... 358/1.13 |
| 2005/0190707 A1 | 9/2005 | Nishizawa et al. |
| 2006/0203280 A1 | 9/2006 | Kobayashi et al. |
| 2006/0221367 A1 | 10/2006 | Shiokawa |
| 2007/0008565 A1 | 1/2007 | Asano |

FOREIGN PATENT DOCUMENTS

| | | |
|---|---|---|
| JP | 2003-337510 | 11/2003 |
| JP | 2005-244623 | 9/2005 |

OTHER PUBLICATIONS

English Language Abstract of JP 2003-337510.
English Language Abstract of JP 2005-244623.

* cited by examiner

*Primary Examiner*—Benny Q Tieu
*Assistant Examiner*—Eric A Rust
(74) *Attorney, Agent, or Firm*—Greenblum & Bernstein, P.L.C.

(57) ABSTRACT

A multifunction apparatus performs a printing process when the apparatus succeeds in user authentication upon receiving a print request from a PC. The multifunction apparatus calculates an expected print start time based on past usage data thereof, that is, an elapsed time required in the past from the print request to user authentication. The multifunction apparatus further calculates an expected operation time required for preparations for the printing process, based on an current operation status thereof, such as standby mode, color registration adjustment, and the like; and sets as a delay time a time derived from subtracting the expected operation time from the expected print start time. The multifunction apparatus starts warm-up when the delay time elapses.

8 Claims, 7 Drawing Sheets

Fig.4

Print job list

| Print job No. | User ID | Print instruction time | User authentication time | Print output time | Machine No. | Document name | Print style | N in 1 |
|---|---|---|---|---|---|---|---|---|
| 1 | User A | 8:40:25 | 8:40:35 | 8:40:39 | JPPCCGC006300 | Network configuration chart | ... | ... |
| 2 | User B | ... | ... | ... | ... | ... | ... | ... |
| 3 | User B | ... | ... | ... | ... | ... | ... | ... |
| 4 | User B | ... | ... | ... | ... | ... | ... | ... |
| 5 | User B | ... | ... | ... | ... | ... | ... | ... |
| 6 | User B | ... | ... | ... | ... | ... | ... | ... |
| 7 | User A | 9:28:25 | 9:32:45 | 9:32:50 | JPPCCGC006300 | ... | ... | ... |
| 8 | User A | 9:32:10 | 9:32:45 | 9:32:55 | JPPCCGC006300 | ... | ... | ... |
| 9 | User A | 9:32:35 | 9:32:45 | 9:32:58 | JPPCCGC006300 | ... | ... | ... |
| 10 | User B | ... | ... | ... | ... | ... | ... | ... |
| 11 | User B | ... | ... | ... | ... | ... | ... | ... |
| 12 | User B | ... | ... | ... | ... | ... | ... | ... |
| 13 | User B | ... | ... | ... | ... | ... | ... | ... |
| 14 | User B | ... | ... | ... | ... | ... | ... | ... |
| 15 | User C | ... | ... | ... | ... | ... | ... | ... |
| 16 | User A | ... | ... | ... | ... | ... | ... | ... |
| 17 | User A | ... | ... | ... | ... | ... | ... | ... |
| 18 | User A | ... | ... | ... | ... | ... | ... | ... |
| 19 | User C | ... | ... | ... | ... | ... | ... | ... |
| 20 | User C | ... | ... | ... | ... | ... | ... | ... |
| ... | ... | ... | ... | ... | ... | ... | ... | ... |

DELAYING A WARM-UP START TIME FOR A PRINTING APPARATUS

BACKGROUND OF THE INVENTION

1. Field of the Invention

The present invention relates to a printing apparatus that causes a printing processor to execute a printing process when a user authenticator provided in the printing apparatus succeeds in user authentication upon receiving a print request from a user terminal.

2. Description of Related Art

A network printing system has been widely used, where a printing apparatus (a printer, a copier, a facsimile machine, a multifunction apparatus, etc.) is connected to a plurality of user terminals via a network, so as to allow the plurality of user terminals to share the printing apparatus. To control the status of use of the printing apparatus, a user authentication system using an RFID (Radio Frequency Identification) and the like has recently been installed to such a network printing system.

A reader provided in the printing apparatus that performs user authentication reads a user ID stored on a card carried by a user for user authentication. After providing a print instruction on a PC, a user goes to the printing apparatus for user authentication. When the printing apparatus needs to be warmed up at this time, such as when the apparatus has been in sleep mode and the like, warm-up starts when user authentication succeeds, and thus causing inconvenience as the user is forced to wait for a long time at the printing apparatus.

To address the problem above, technology is known that starts warm-up immediately after the printing apparatus receives the print instruction from the user terminal (Related Art 1), thus preventing the inconvenience where the user is forced to wait for long time at the printing apparatus. In addition, technology is known where an RFID system, which allows wireless communication in an area of about 1 m, detects that the user is coming close to the printing apparatus and entering a card detectable area of the reader, so as to start warm-up (Related Art 2). The technology can also expedite a warm-up start time and thus reduce the user's wait time.

[Related Art 1] Japanese Patent Laid-open Publication 2003-337510

[Related Art 2] Japanese Patent Laid-open Publication 2005-244623

However, with the conventional art that starts warm-up in response to the print request received from the user terminal, warm-up starts even when a print output does not need to be picked up immediately, thus wasting power consumption because the warm-up start timing is too early. Further, with the conventional art that starts warm-up when the user's card enters the reader's detectable area, warm-up may take longer than user authentication, thereby possibly causing some wait time and thus unable to fully eliminate the inconvenience where the user is forced to wait at the printing apparatus.

SUMMARY OF THE INVENTION

The present invention is provided to address the problems in the conventional arts. A main object of the present invention is to provide a printing apparatus that eliminates inconvenience where a user is forced to wait for a long time at the printing apparatus and that prevents waste of power consumption since warm-up starts too early.

The printing apparatus according to the present invention includes a controller that controls a printing processor to execute a printing process when a user authenticator provided in the printing apparatus succeeds in user authentication upon receiving a print request from a user terminal. When receiving the print request from the user terminal, the controller determines whether or not to perform a delay process for delaying a warm-up start time of the printing processor, based on past usage data and a current operation status of the printing apparatus. When performing the delay process, the controller controls the printing processor to start warm-up at a time when a predetermined delay time elapses.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 illustrates an example of information stored on a print job control table in a print job information storage shown in FIG. 2;

DETAILED DESCRIPTION OF PREFERRED EMBODIMENTS

The embodiments of the present invention are explained in the following, with reference to the above-described drawings.

Figure 1:
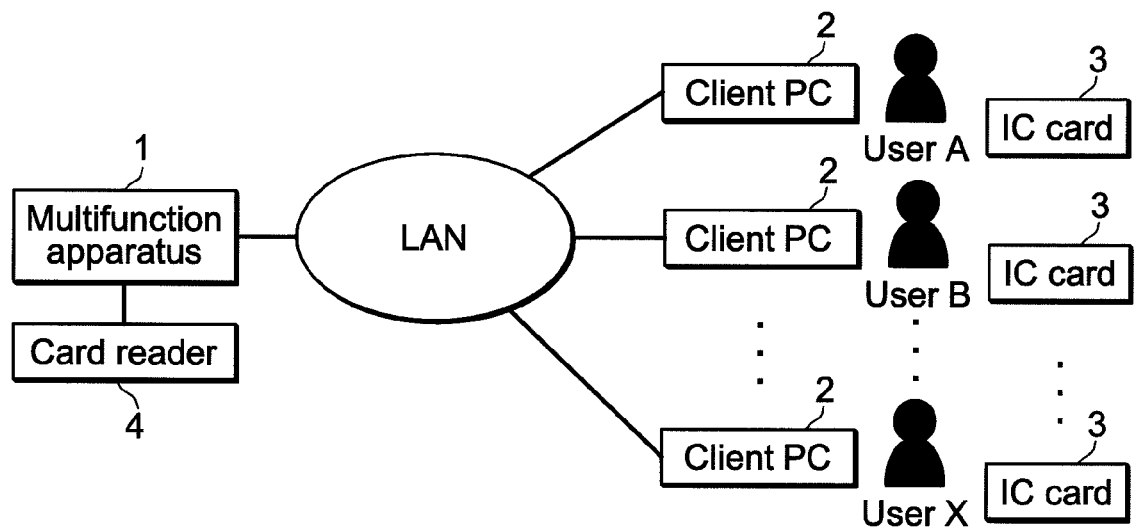
FIG. 1 illustrates a configuration of a printing system to which the present invention is applied.

FIG. 1 illustrates a configuration of a printing system to which the present invention is applied. In the system, multifunction apparatus (printing apparatus) 1 according to the present invention is connected to a plurality of client PCs (user terminals) 2 via a network. Each of client PCs 2 issues a print request to multifunction apparatus 1 when a user instructs printing of a document on a predetermined application by specifying multifunction apparatus 1 as a printer. Then, multifunction apparatus 1 stores the document in a memory thereof.

Multifunction apparatus 1 is provided with card reader 4 that reads IC card 3 carried by each user. Based on a user ID (personal identification information) obtained from IC card 3, multifunction apparatus 1 performs user authentication for determining whether or not the user who is going to perform printing is a proper user authorized for printing. After instructing printing on client PC 2, the user comes to multifunction apparatus 1 and then card reader 4 reads IC card 3 for authentication. When user authentication is successful, printing is performed and a printed document is obtained. User authentication may be performed in a different method, such as biometrics and the like.

Figure 2:
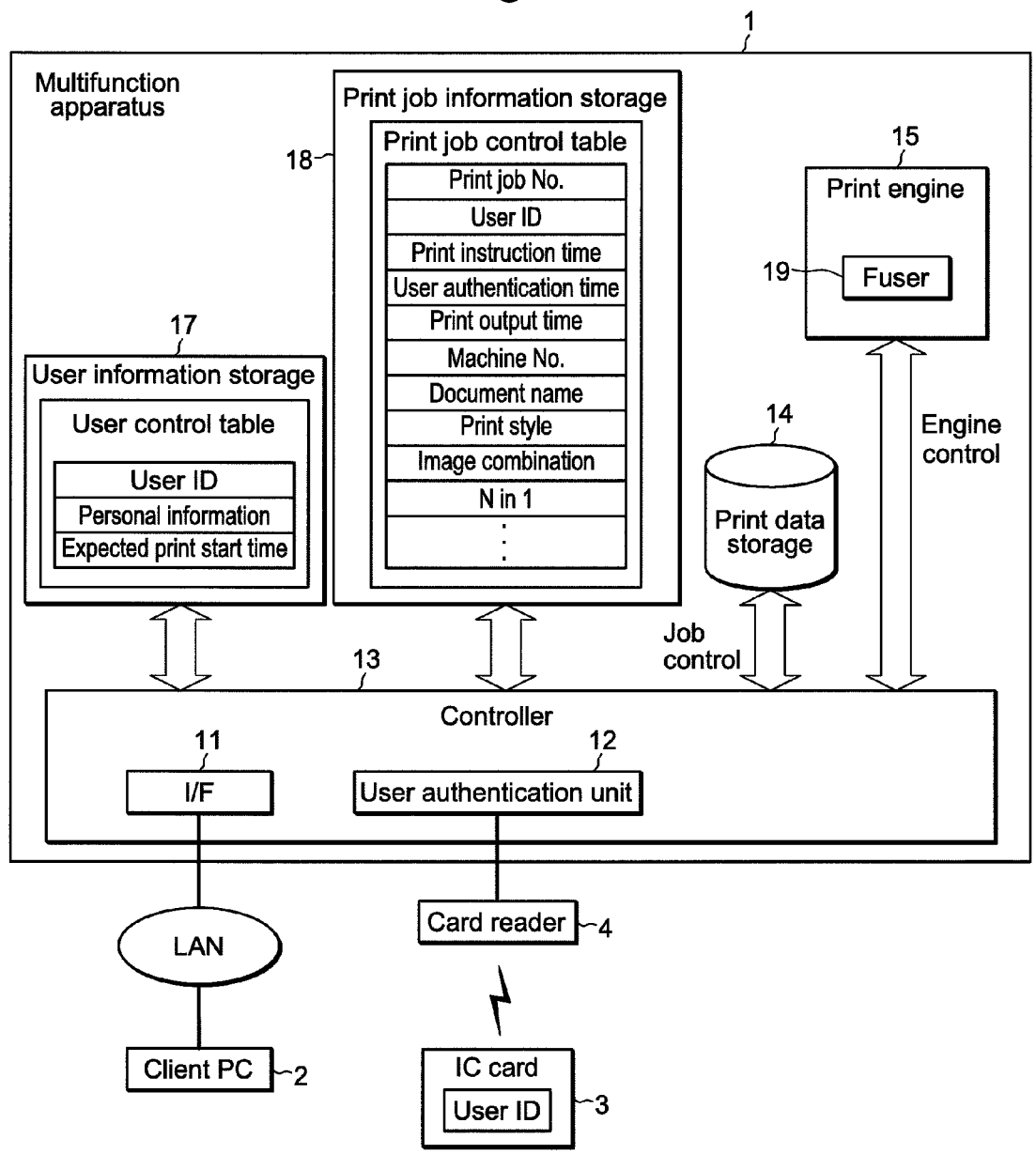
FIG. 2 is a block diagram illustrating a general configuration of multifunction apparatus 1 shown in FIG. 1.

FIG. 2 is a block diagram illustrating a general configuration of multifunction apparatus 1 shown in FIG. 1. Multifunction apparatus 1 has controller 13, print data storage 14, and print engine (printing processor) 15. Controller 13 includes interface 11, which receives from client PC 2 via the network a print request and print data associated with the print request; and user authenticator 12, which obtains a user ID from IC card 3 via card reader 4 and performs user authentication. Print data storage 14 stores the print data received from client PC 2. Print engine 15 performs a printing process based on the print data retrieved from print data storage 14.

Print engine 15 has a variety of devices related to image forming processes in an electrophotography method, including charge, exposure, development, and transfer. Particularly, print engine 15 has fuser 19, which is to be controlled in warm-up control according to the present invention.

Multifunction apparatus 1 further includes user information storage 17 and print job information storage 18. User information storage 17 stores as a user control table, information related to a user who uses the apparatus. Print job information storage 18 stores as a print job control table, information related to a print job requested from client PC 2.

The user control table stored in user information storage 17 includes per user of the printing apparatus, a user ID, other personal information, and an expected print start time. The user ID is used for user authentication as being compared against a user ID obtained from IC card 3 during user authentication at user authenticator 12. The personal information includes a user's name, a department to which the user belongs, an administration code, and the like, which are used for charging per department.

The expected print start time is a time from when the print request is received from client PC 2 to when print engine 15 is expected to start the printing process after the user performs an operation for authentication. Setting the expected print start time per user allows warm-up control of print engine 15 per user. The expected print start time is reset when a predetermined collection period elapses. The collection period can be set appropriately, such as daily, weekly, monthly, or the like.

The expected print start time may be set on an operation panel provided to multifunction apparatus 1 or remotely from an administrator's terminal connected to the network.

The print job control table stored in print job information storage 18 includes per print job received from client PC 2, a print job number, a user ID, a print instruction time, a user authentication time, a print output time, a machine number, a document name, a print style, image combination, and other information.

The user ID is for identifying a user who instructs a print job. The print instruction time is a time when a print request is received from client PC 2. The user authentication time is a time when user authentication is successfully completed in which card reader 4 reads IC card 3 of the user. The print output time is a time when the print engine executes a printing process. The machine number is apparatus identification information provided to an apparatus. An IP address may be used as the machine number.

Figure 3:
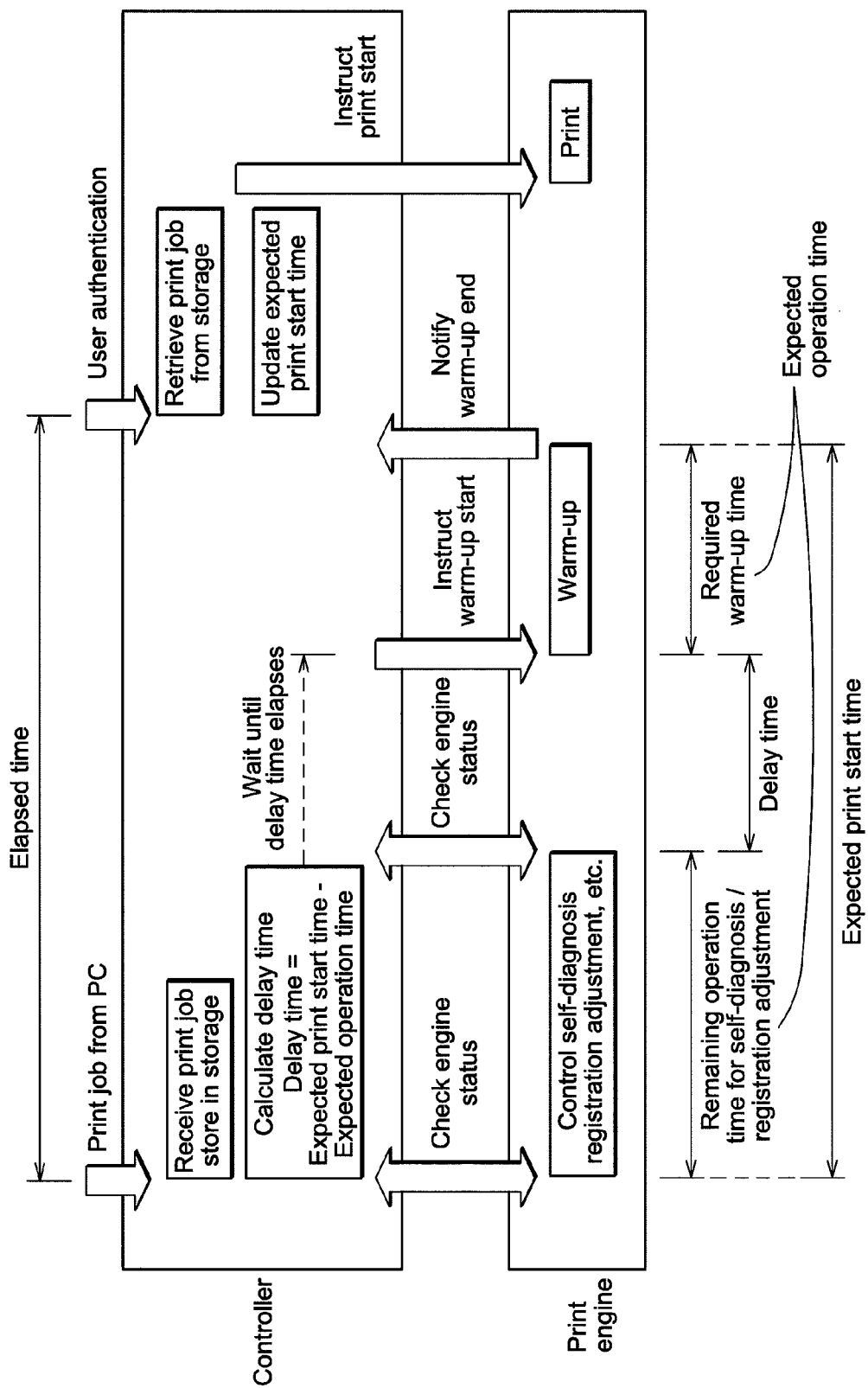
FIG. 3 is a timing chart illustrating warm-up control in multifunction apparatus 1 shown in FIG. 2.

FIG. 3 is a timing chart illustrating warm-up control in multifunction apparatus 1 shown in FIG. 2. When receiving the print job from client PC 2, controller 13 stores the print data in print data storage 14. Further, controller 13 calculates a delay time, which is a time for print engine 15 to wait before starting warm-up after completing preparations required for the printing process.

In delay time calculation, controller 13 first checks an operation status of print engine 15 upon receiving the print job from client PC 2, and then, based on the operation status, calculates an operation time required for preparations before warm-up, such as self-diagnosis, color registration adjustment, and the like. Controller 13 further retrieves the expected print start time of the relevant user stored in user information storage 17. Then, controller 13 obtains the delay time by subtracting an expected operation time required for the above-described preparations before warm-up and for warm-up, from the expected print start time.

The delay time is calculated as described above, and then the multifunction apparatus waits until the delay time elapses after completing the preparations before warm-up, including self-diagnosis. When the delay time elapses, controller 13 outputs a signal to start warm-up to print engine 15, which then starts warm-up of fuser 19.

Meanwhile, after instructing printing on client PC 2, the user comes to multifunction apparatus 1, and card reader 4 reads IC card 3 for authentication. Then, controller 13 compares the user ID obtained from IC card 3 with the user ID stored in user information storage 17, and verifies whether or not the user is a proper user authorized for printing.

When user authentication succeeds, controller 13 retrieves the relevant print data from print data storage 14, and sends the print data to print engine 15 along with an instruction to start printing. Then, print engine 15 performs printing based on the print data, thus allowing the user to immediately obtain a printed document without waiting at multifunction apparatus 1.

As described later in detail, controller 13 further compares the time from receipt of the print request from the client PC to completion of user authentication, with the expected print start time stored on the user control table in user information storage 17, and then updates the expected print start time on the user control table.

FIG. 4 illustrates an example of information stored on the print job control table in print job information storage 18 shown in FIG. 2. The expected print start time shown in FIG. 3 is set based on the shortest time among past elapsed times required from receipt of the print request from client PC 2 to completion of user authentication. In case of User A, for instance, the elapsed time from the print instruction time to the user authentication time is 10 seconds for print job 1; 4 minutes 20 seconds for print job 7; 35 seconds for print job 8; and 10 seconds for print job 9. Thus, 10 seconds, which is the shortest time, is set as the expected print start time for User A.

Figure 5:
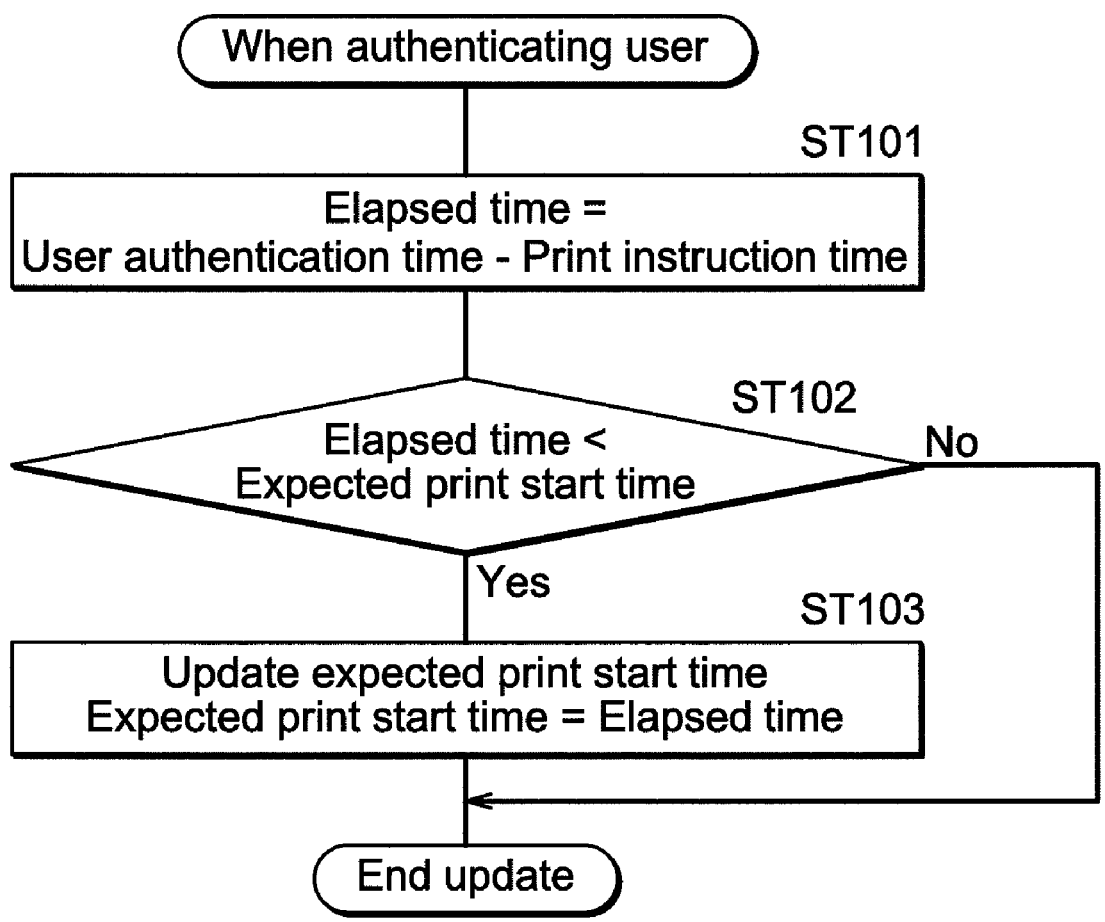
FIG. 5 is a flowchart illustrating a procedure for setting an expected print start time performed in the controller shown in FIG. 2.

FIG. 5 is a flowchart illustrating a procedure for setting the expected print start time performed in controller 13 shown in FIG. 2. As described above, print job information storage 18 stores the print instruction time and the user authentication time per print job. When user authentication is performed with IC card 3, controller 13 calculates the latest elapsed time, that is, the time from receipt of the print request from the client PC to completion of user authentication for the print request, by subtracting the print instruction time from the user authentication time (Step 101).

Subsequently, controller 13 retrieves the expected print start time of the relevant user stored on the user control table in user information storage 17, and compares the retrieved expected print start time with the latest elapsed time (Step 102). When the latest elapsed time is shorter than the expected print start time, controller 13 updates the expected print start time on the user control table, so as to set the latest elapsed time as the expected print start time (Step 103).

As described above, every time performing user authentication, controller 13 compares the expected print start time, which is the shortest elapsed time until the moment, with the latest elapsed time; and then sets the shortest elapsed time as the expected print start time. Controller 13 sets the latest elapsed time as the expected print start time, immediately after the expected print start time on the user control table is reset as the predetermined collection period elapses.

Figure 6:
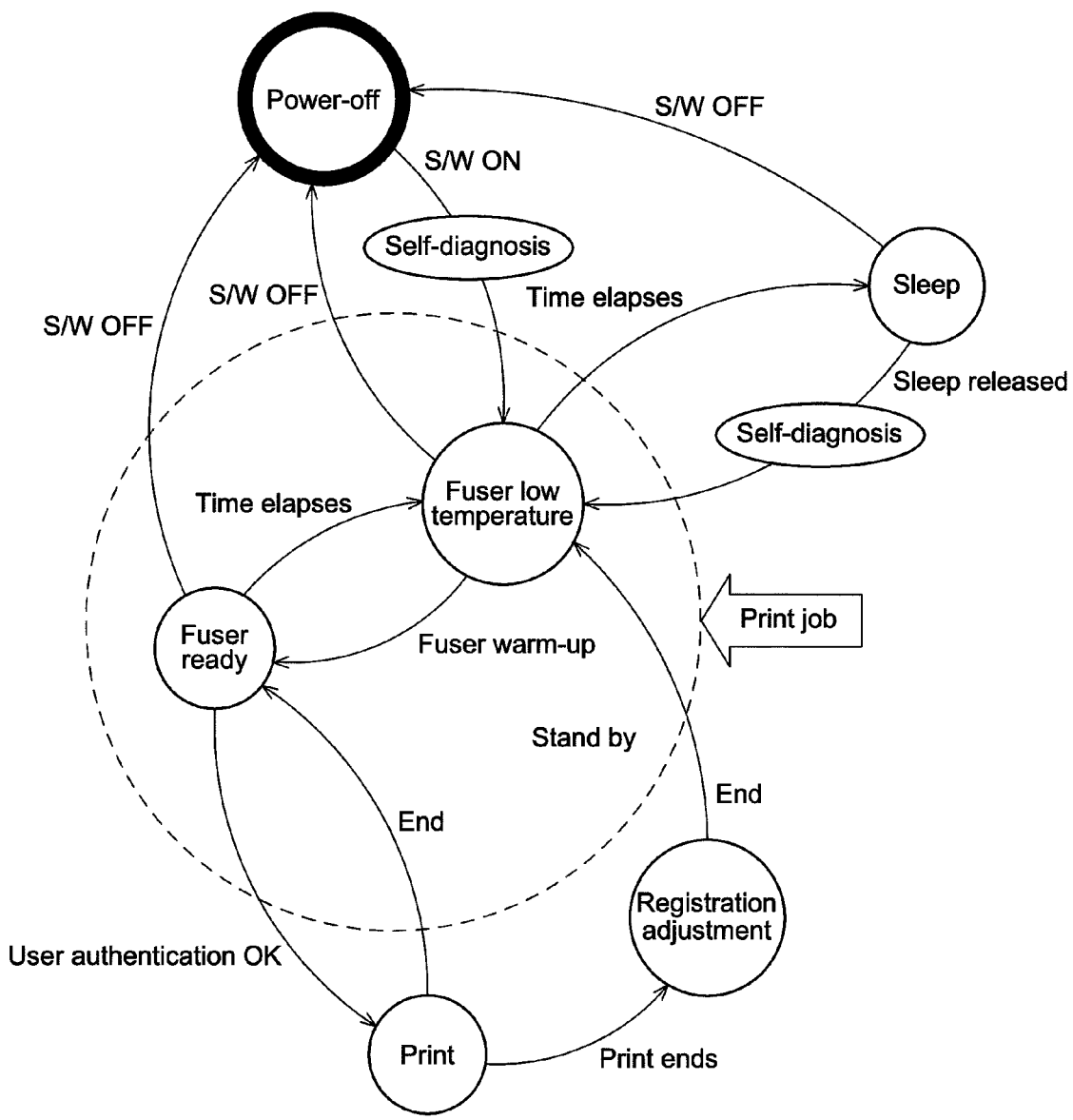
FIG. 6 illustrates status transition of the multifunction apparatus shown in FIG. 2.

FIG. 6 illustrates status transition of multifunction apparatus 1 shown in FIG. 2. Multifunction apparatus 1 is turned on in power-off mode. When receiving a wake-up signal transmitted from the client PC according to the print instruction provided thereon, multifunction apparatus 1 supplies power to controller 13 and print engine 15. Then, control circuits, including controller 13, execute self-diagnosis; and print engine 15 starts warm-up of fuser 19 (fuser heat-up) and enters printable mode (fuser ready), where a predetermined fusing temperature is retained under temperature control.

When user authorization succeeds in the printable mode (fuser ready), printing is performed. When predetermined registration execution conditions, such as a number of copies to print and the like, are met at the time of completion of printing, print engine 15 forms and detects a test pattern, and adjusts color registration for correcting operation conditions in each of the devices in print engine 15, so as to achieve proper image forming.

When there is no more print job in the printable mode (fuser ready), temperature control of fuser 19 stops. Then, the temperature goes down below the predetermined fusing temperature (fuser low temperature) since heat dissipates as time elapses. When a predetermined time elapses, multifunction apparatus 1 stops power supply to print engine 15 and the like, or enters sleep mode. When a sleep release factor occurs, such as receipt of a print job, multifunction apparatus 1 resumes power supply. Then, the control circuits, to which power supply has been suspended, execute self-diagnosis, and fuser 19 starts warm-up, and thus multifunction apparatus 1 enters the printable mode (fuser ready).

When in standby mode at the time of receipt of the print job, where the temperature is below the predetermined fusing temperature (fuser low temperature), multifunction apparatus 1 needs to warm up fuser 19 so as to enter the printable mode (fuser ready). Thus, the expected operation time shown in FIG. 3 is a required warm-up time.

When adjusting color registration at the time of receipt of the print job, multifunction apparatus 1 needs to perform the remaining operations for color registration adjustment and to warm up fuser 19, so as to enter the printable mode (fuser ready). Thus, the expected operation time shown in FIG. 3 is a sum of the remaining time for color registration adjustment and the required time for warm-up.

When in the sleep mode at the time of receipt of the print job, multifunction apparatus 1 needs to perform self-diagnosis of the control circuits, to which power supply has been suspended, and to warm up fuser 19, so as to enter the printable mode (fuser ready). Thus, the expected operation time shown in FIG. 3 is a sum of the self-diagnosis time and the required warm-up time.

When immediately after turning on upon receiving the wake-up signal from client PC 2 at the time of receipt of the print job, multifunction apparatus 1 needs to perform self-diagnosis of the control circuits, to which power supply has been suspended, and to warm up fuser 19, so as to enter the printable mode (fuser ready). Thus, the expected operation time shown in FIG. 3 is a sum of the self-diagnosis time and the warm-up time.

Figure 7:
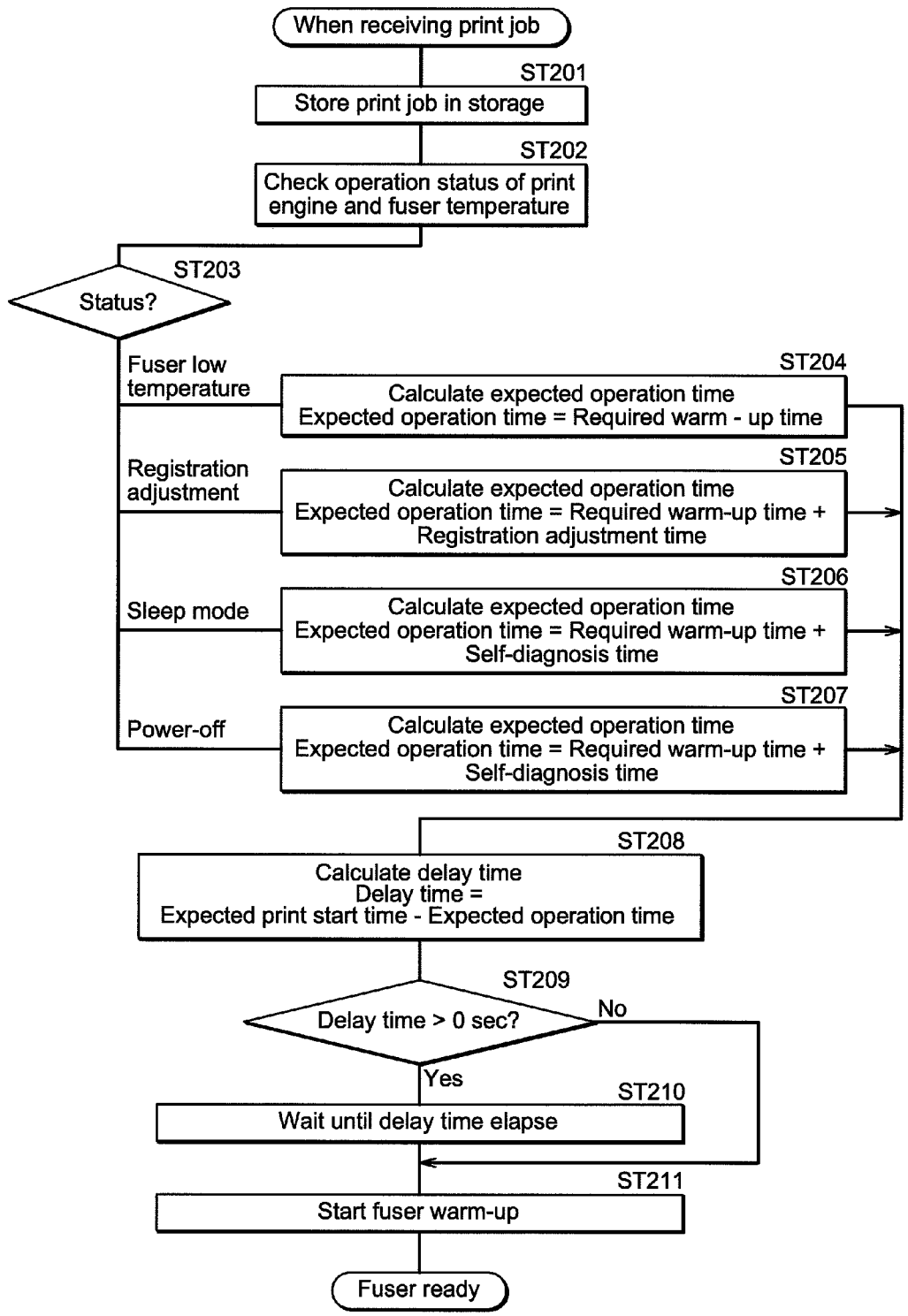
FIG. 7 is a flowchart illustrating a procedure for warm-up control performed in the controller shown in FIG. 2.

FIG. 7 is a flowchart illustrating a procedure for warm-up control performed in controller 13 shown in FIG. 2. When receiving the print job from client PC 2, controller 13 stores the print data in print data storage 14 (Step 201), and checks the operation status of print engine 15 and the temperature of fuser 19 (Step 202).

According to the operation status of the multifunction apparatus (Step 203), controller 13 then calculates the expected operation time (Steps 204 to 207). More specifically, controller 13 calculates the expected operation time from the required warm-up time, when multifunction apparatus 1 is in the standby mode (fuser low temperature) (Step 204); adds the remaining time for color registration adjustment to the required warm-up time, when multifunction apparatus 1 is adjusting color registration (Step 205); adds the self-diagnosis time to the required warm-up time, when multifunction apparatus 1 is in the sleep mode (Step 206); and adds the self-diagnosis time to the required warm-up time, when multifunction apparatus 1 is turned off (Step 207). The required warm-up time increases or decreases according to the current temperature of fuser 19.

Subsequently, controller 13 calculates the delay time before starting warm-up after completing the preparations before warm-up, such as self-diagnosis, color registration adjustment, and the like (Step 208). In this step, controller 13 retrieves the expected print start time of the relevant user stored in user information storage 17. Controller 13 subtracts the expected operation time, which was calculated in the preceding process (Steps 204 to 207), from the expected print start time so as to calculate the delay time. When the calculated delay time is greater than 0 seconds (Step 209), controller 13 has multifunction apparatus 1 wait until the delay time elapses after completing the preparations before warm-up (Step 210). When the delay time elapses, controller 13 causes print engine 15 to start warm-up (Step 211). On the other hand, when the delay time is less than 0 seconds (Step 209), controller 13 immediately starts warm-up (Step 211).

As described above, controller 13 determines whether or not to perform the delay process for delaying the warm-up start time of print engine 15, based on the past usage data and current operation status of the multifunction apparatus (Step 209). When the delay time is a positive value, that is, when controller 13 determines that there is time before warm-up starts and that the delay process is appropriate, controller 13 delays the warm-up start time. Thereby, multifunction apparatus 1 eliminates inconvenience where a user is forced to wait for a long time at multifunction apparatus 1 and prevents waste of power consumption since warm-up starts too early.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2006-113307 filed on Apr. 17, 2006, entire content of which is expressly incorporated by reference herein.

What is claimed is:

1. A printing apparatus comprising: a controller that controls a printing processor to execute a printing process when a user authenticator provided in the printing apparatus succeeds in user authentication upon receiving a print request from a user terminal, wherein when receiving the print request from the user terminal, the controller determines whether or not to perform a delay process for delaying a warm-up start time of the printing processor, based on past usage data and a current operation status of the printing apparatus; and when performing the delay process, the controller, controls the printing processor to start warm-up at a time when a predetermined time elapses; and wherein the controller calculates an expected print start time, which is from when the print request is received from the user terminal to when the printing processor is expected to start a printing process, based on the past usage data of the printing apparatus; and the controller calculates an expected operation time required for preparations for the printing processor to perform the printing process, based on the current operation status of the printing apparatus; and sets, as the delay time, a time being derived from subtracting the expected operation time from the expected print start time.

2. The printing apparatus according to claim 1, wherein the controller collects the past usage data of the printing apparatus per user.

3. The printing apparatus according to claim 2, wherein the controller obtains the expected print start time based on a shortest time among past elapsed times required from receipt of the print request from the user terminal to performance of user authentication.

4. The printing apparatus according to claim 2, wherein the controller calculates the expected operation time from a required warm-up time, when the printing apparatus is in standby mode.

5. The printing apparatus according to claim 2, wherein the controller calculates the expected operation time by adding a color registration adjustment time to the required warm-up time, when the printing apparatus is adjusting color registration.

6. The printing apparatus according to claim 2, wherein the controller calculates the expected operation time by adding a self-diagnosis time to the required warm-up time, when the printing apparatus is in sleep mode.

7. The printing apparatus according to claim 2, wherein the controller calculates the expected operation time by adding the self-diagnosis time to the required warm-up time, immediately after the printing apparatus has turned on from power-off mode in response to the print request from the user terminal.

8. The printing apparatus according to claim 1, wherein the controller discards the past usage data of the printing apparatus every time when a predetermined collection period elapses, and newly starts collecting usage data.

* * * * *